(12) United States Patent
Blixhavn et al.

(10) Patent No.: US 6,304,827 B1
(45) Date of Patent: Oct. 16, 2001

(54) SENSOR CALIBRATION

(75) Inventors: Bjørn Blixhavn, Tonsberg; Helge Grinde, Tolvsrød, both of (NO)

(73) Assignee: Sensonor ASA, Horten (NO)

( * ) Notice: Subject to any disclaimer, the term of this patent is extended or adjusted under 35 U.S.C. 154(b) by 0 days.

(21) Appl. No.: 09/397,530

(22) Filed: Sep. 16, 1999

(51) Int. Cl.$^7$ .................................................. G01D 18/00
(52) U.S. Cl. ............................ 702/104; 702/99; 73/1.88; 73/1.61; 33/702
(58) Field of Search .............................. 33/702, 706, 707, 33/708; 374/142; 702/99, 104; 73/1.88, 1.61

(56) References Cited

U.S. PATENT DOCUMENTS

| | | | |
|---|---|---|---|
| 4,072,051 | * | 2/1978 | Peterson ............................ 374/142 |
| 4,949,469 | * | 8/1990 | Wachtler ............................. 33/702 |
| 5,247,467 | * | 9/1993 | Nguyen et al. ..................... 702/104 |
| 5,559,431 | * | 9/1996 | Sellen ................................. 702/104 |
| 5,848,383 | * | 12/1998 | Yunus ................................. 702/99 |
| 6,055,489 | * | 4/2000 | Beatty et al. ....................... 702/99 |

* cited by examiner

Primary Examiner—Diego Gutierrez
Assistant Examiner—Madeline Gonzalez
(74) Attorney, Agent, or Firm—Andrus, Sceales, Starke & Sawall, LLP

(57) ABSTRACT

A device for compensating for temperature dependent effects on an electronic sensor output signal. The device is capable of receiving a digital output signal from an electronic sensor and receiving a digital output signal from an electronic sensor and receiving a digital signal indicative of the temperature of the sensor. The device produces an output signal dependent upon the received sensor and temperature signal and based upon the compensation polynomial $H(V,T)$, where:

$$H(V,T) = \frac{1}{G \cdot S_0}\left[V \cdot \left(1 + \sum_{i=1}^{m} S_i T^i\right) - Z_0 - \sum_{j=1}^{n} Z_j T^j\right]$$

where T is temperature, V is the output of the sensor, G is a gain value, $S_0$ is the sensitivity at a fixed value of $T=0$, $Z_0$ is the sensor offset voltage at a value of $T=0$, $S_i$ is the $i^{th}$ order coefficient of sensitivity temperature drift, $Z_j$ is the $j^{th}$ order coefficient of offset temperature drift and m and n are integers, $S_m$ and $Z_n$ being the highest order coefficients. A corresponding method of generating a temperature compensated signal is also provided.

10 Claims, 1 Drawing Sheet

SENSOR CALIBRATION

BACKGROUND OF THE INVENTION

This invention relates to the calibration of electronic sensors.

Electronic sensors are employed in a number of different fields of technology. Such sensors may be employed to detect changes in environmental parameters, such as atmospheric pressure, or may be employed to detect changes in forces applied to the object to which they are attached, for example.

Whilst there are very many different types of sensor, one problem common to most is that of temperature sensitivity. Variation of the sensor output with temperature can cause considerable difficulty both in terms of provision of sufficient accuracy and also in relation to the generation of erroneous warning signals.

One approach to compensate for temperature variations is to calibrate each sensor individually during manufacture. This means, however, a considerable increase in production costs.

In recent times an alternative approach to temperature compensation has been proposed. In this alternative approach the sensor itself or its associated circuitry is provided with means for calculating and providing an offset to the output of the sensor dependent upon the temperature. Such an approach requires mathematical modelling of the sensor output with respect to temperature. Such an approach has problems, however, in that the algorithm employed to model the sensor output requires complex division of high order functions in order to be able to provide accurate modelling. It will be appreciated that the requirement for division increases the compensation circuit complexity and increases processing time.

SUMMARY OF THE INVENTION

The present invention seeks to overcome the above problems.

According to the present invention there is provided a device for compensating for temperature dependent effects on an electronic sensor output signal, the device comprising:

- means for receiving a digital output signal from an electronic sensor;
- means for receiving a digital signal indicative of the temperature of the sensor; and
- means for producing an output signal dependent upon the received sensor and temperature signal and based upon the compensation polynomial H(V,T), where:

$$H(V, T) = \frac{1}{G \cdot S_0} \left[ V \cdot \left(1 + \sum_{i=1}^{m} S_i T^i \right) - Z_0 - \sum_{j=1}^{n} Z_j T^j \right]$$

where T is temperature, V is the output of the sensor, G is a gain value, $S_0$ is the sensitivity at a fixed value of T=0, $Z_0$ is the sensor offset voltage at a value of T=0, $S_i$ is the $i^{th}$ order coefficient of sensitivity temperature drift, $Z_j$ is the $j^{th}$ order coefficient of offset temperature drift and m and n are integers, $S_m$ and $Z_n$ being the highest order coefficients.

With the device of the present invention an output signal can be generated by employing simple digital signal processing circuitry without the need for division. Not only does this reduce the complexity required but it also improves the accuracy of the compensation.

The real temperature at which T=0 can be set at any real value, but is preferably a median value (for example 25° C.) for the operating environment of the sensor.

Ideally highest order coefficients, $S_m$ and $Z_n$, are second order, ie. $S_2$ and $Z_2$, however it will be appreciated that higher order coefficients such as $S_3$ and $Z_3$ may be employed in order to further increase accuracy, although these will, of course, increase circuit complexity. Highest order coefficients of lower order may also be used for simplicity, although this will, of course, decrease accuracy.

The device may be formed as an integral part of the sensor, or may be formed separately.

A corresponding method of generating a temperature compensated signal is also provided.

DETAILED DESCRIPTION OF THE INVENTION

Figure 1:
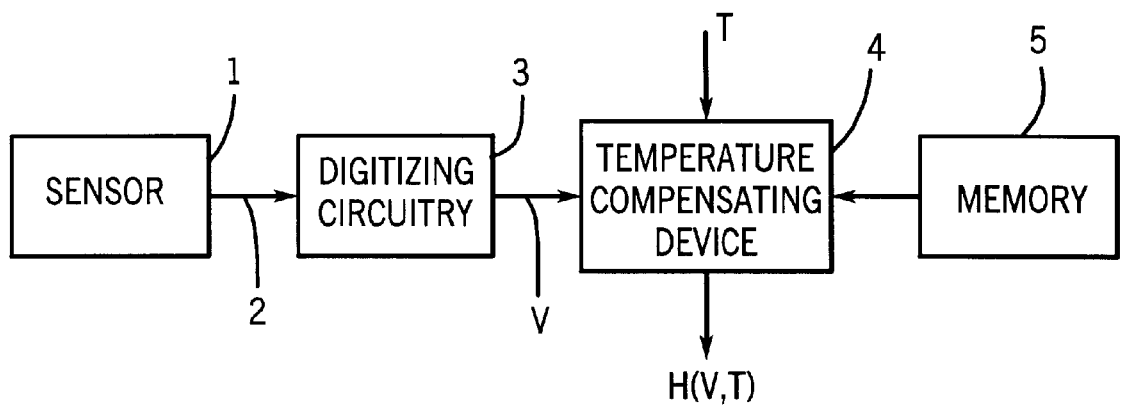
FIG. 1 is a schematic block diagram showing the components of the device of the present invention.

One example of the present invention will now be described with reference to the accompanying drawing, which is a schematic block diagram showing components including a device according to the present invention.

Referring to FIG. 1, a sensor 1, which may be a pressure sensor, angular rate sensor, acceleration sensor etc., provides an output signal 2 to digitising circuitry 3. The output signal 2 is indicative of the parameter being sensed by the sensor 1. A suitable digitising circuit would be a charge-balancing integrating converter with 11 bit signed resolution and a clock frequency of 1 MHz. The digitizing circuit 3, provides an output 3 to a temperature compensating device 4. The temperature compensating device 4 also receives a digital signal T representative of sensor temperature. The temperature sensing device may suitably be a digital PTAT (proportional to absolute temperature) voltage reference.

The temperature compensation device 4 forms a compensation algorithm H(V,T) and produces a compensated output base thereon. The algorithm H (V,T) requires a series of fixed value coefficients which may be provided from a memory 5. These coefficients include a gain coefficient G, coefficients of sensitivity temperature drift ($S_1$, $S_2$, etc.), coefficients of offset temperature drift ($Z_1$, $Z_2$, etc.) and a sensitivity value $S_0$ and offset voltage $Z_0$ at a reference value T=0. The number of coefficients is dependent upon the order to which the algorithm is calculated with respect to T.

The algorithm H(V,T) is represented by:

$$H(V, T) = \frac{1}{G \cdot S_0} \left[ V \cdot \left(1 + \sum_{i=1}^{m} S_i T^i \right) - Z_0 - \sum_{j=1}^{n} Z_j T^j \right]$$

The physical value at which T=0 can be chosen dependent upon the operating temperatures for the sensor. For example, T=0 may be set at 25° C.

The temperature compensation circuitry 4 can be created quite simply because there is no need for any form of division, given that the value $1/G.S_0$ can be calculated and stored in the memory 5. In addition, the lack of need for division increases accuracy of the compensation.

It will be appreciated that all the components may be formed integrally with the sensor 1, including the source of temperature dependent signal. The whole operation may be performed by an appropriately configured microprocessor or by a dedicated ASIC.

What is claimed is:

1. A device for compensating for temperature dependent effects on an electronic sensor output signal, the device comprising:

a first means for receiving a digital output signal from an electronic sensor;

a second means for receiving a digital signal indicative of the temperature of the sensor and for producing an output signal dependent upon the sensor signal received from the first means and the temperature signal and based upon a compensation polynomial H(V,T), where:

$$H(V, T) = \frac{1}{G \cdot S_0} \left[ V \cdot \left( 1 + \sum_{i=1}^{m} S_i T^i \right) - Z_0 - \sum_{j=1}^{n} Z_j T^j \right]$$

where T is temperature, V is the output of the sensor, G is a gain value, $S_0$ is the sensitivity at a fixed value of T=0, $Z_0$ is the sensor offset voltage at a value of T=0, $S_i$ is the $i^{th}$ order coefficient of sensitivity temperature drift, $Z_j$ is the $j^{th}$ order coefficient of offset temperature drift and m and n are integers, $S_m$ and $Z_n$ being the highest order coefficients.

2. A device according to claim 1, wherein m=n.

3. A device according to claim 2, wherein n=2.

4. A device according to claim 1, wherein at least one of m and n>=3.

5. A device according to any preceeding claim, formed as an integral part of the sensor.

6. A device according to claim 5 formed as part of an ASIC.

7. A method of compensating for temperature dependent effects on an electronic sensor output signal, the method comprising:

providing a signal receiving and producing means that is operably connected to an electronic sensor;

receiving a digital output signal from the electronic sensor;

receiving a digital signal indicative of the temperature of the sensor; and producing an output signal dependent upon the received sensor and temperature signals and based upon a compensation polynomial H(V,T), where:

$$H(V, T) = \frac{1}{G \cdot S_0} \left[ V \cdot \left( 1 + \sum_{i=1}^{m} S_i T^i \right) - Z_0 - \sum_{j=1}^{n} Z_j T^j \right]$$

where T is temperature, V is the output of the sensor, G is a gain value, $S_0$ is the sensitivity at a faxed value of T=0, $Z_0$ is the sensor offset voltage at a value of T=0, $S_i$ is the $i^{th}$ order coefficient of sensitivity temperature drift, $Z_j$ is the $j^{th}$ order coefficient of offset temperature drift and m and n are integers, $S_m$ and $Z_n$ being the highest order coefficients.

8. A method according to claim 7, wherein m=n.

9. A method according to claim 8, wherein n=2.

10. A method according to claim 7, wherein at least one of m and n>=3.

* * * * *